United States Patent
Lawrence

(10) Patent No.: US 10,899,563 B1
(45) Date of Patent: Jan. 26, 2021

(54) SELF-CLEARING COUNTER-STACKER WITH STACKING FRAME

(71) Applicant: Lawrence Equipment Inc., South El Monte, CA (US)

(72) Inventor: Eric Clay Lawrence, Hungtington Beach, CA (US)

(73) Assignee: Lawrence Equipment Inc., South El Monte, CA (US)

( * ) Notice: Subject to any disclaimer, the term of this patent is extended or adjusted under 35 U.S.C. 154(b) by 0 days.

(21) Appl. No.: 16/698,042

(22) Filed: Nov. 27, 2019

(51) Int. Cl.
| | |
|---|---|
| *B65B 35/50* | (2006.01) |
| *B65B 57/20* | (2006.01) |
| *B65G 57/11* | (2006.01) |
| *B65G 43/08* | (2006.01) |
| *B07C 5/38* | (2006.01) |
| *B65G 57/03* | (2006.01) |
| *A21C 9/08* | (2006.01) |

(52) U.S. Cl.
CPC ............... *B65G 57/11* (2013.01); *B07C 5/38* (2013.01); *B65B 57/20* (2013.01); *B65G 43/08* (2013.01); *B65G 57/03* (2013.01); *A21C 9/086* (2013.01)

(58) Field of Classification Search
CPC ....... B07C 5/342; B07C 5/3422; B07C 5/361; B07C 5/38; B07C 5/367; B07C 5/368; B07C 2501/0081
See application file for complete search history.

(56) References Cited

U.S. PATENT DOCUMENTS

| | | | | |
|---|---|---|---|---|
| 2,570,288 A | * | 10/1951 | Todd | B65H 29/62 209/587 |
| 4,006,831 A | * | 2/1977 | Jimenez | B65B 35/50 414/789 |
| 4,405,186 A | * | 9/1983 | Sandberg | B26D 7/32 271/218 |
| 4,530,632 A | | 7/1985 | Sela | |

(Continued)

OTHER PUBLICATIONS

Arr-Tech Automation Technology [online], "Flat Bread 2007—Promotional Video", retrieved on Oct. 7, 2019, <https://www.youtube.com/watch?v=fSHKA-TIFR0>, 1 page [Video Submission].

Arr-Tech Automation Technology [online], "Genesis Corn Tortilla Counter/Stacker", retrieved on Oct. 7, 2019, <https://www.arr-tech.com/products/product.html?productid=1>, 2 pages [Video Submission].

(Continued)

*Primary Examiner* — Gregory W Adams
(74) *Attorney, Agent, or Firm* — Fish & Richardson P.C.

(57) ABSTRACT

Methods, systems, and apparatus, including computer programs encoded on computer storage media, for removing a non-conforming comestible from a counter-stacker. One of the methods includes receiving, on an upper conveyor included in a counter-stacker, a first comestible; transferring, by the counter-stacker that includes a stacking frame and a stacking platform and while the first comestible substantially maintains its shape, the first comestible through an aperture defined within the stacking frame and onto the stacking platform; creating, by the counter-stacker, a stack of comestibles that includes the first comestible and has a threshold quantity; receiving, on the upper conveyor, a second comestible; rotating, by one or more actuators included in the counter-stacker that are coupled to the stacking frame, the stacking frame to cause the second comestible to fall onto a lower conveyor; and removing, by the lower conveyor, the second comestible from the counter-stacker.

25 Claims, 7 Drawing Sheets

(56) References Cited

U.S. PATENT DOCUMENTS

| | | | | |
|---|---|---|---|---|
| 4,938,336 | A * | 7/1990 | Aquino | B65G 47/647 198/369.2 |
| 4,938,657 | A * | 7/1990 | Benson | B65G 57/06 271/188 |
| 5,078,255 | A * | 1/1992 | Haley | B65G 47/647 198/358 |
| 5,624,366 | A * | 4/1997 | Beeri | B65H 45/04 493/23 |
| 5,720,593 | A | 2/1998 | Pleake | |
| 5,779,432 | A | 7/1998 | Pena | |
| 6,520,734 | B2 | 2/2003 | Longoria et al. | |
| 6,585,477 | B1 | 7/2003 | Lawrence | |
| 7,971,877 | B2 * | 7/2011 | Grob | B65H 29/62 271/248 |
| 8,812,146 | B2 * | 8/2014 | Einarsson | B07C 5/38 700/114 |
| 9,271,505 | B2 | 3/2016 | Christopher et al. | |
| 2005/0099620 | A1 * | 5/2005 | De La Ballina | G01B 11/2433 356/237.1 |
| 2012/0138514 | A1 * | 6/2012 | Janssens | G01N 21/21 209/577 |

OTHER PUBLICATIONS

Arr-Tech.com [online], "Geneses Flat Bread", retrieved on Oct. 2019, <https://www.arr-tech.com/img/products/3.pdf>, 2 pages.

Arr-Tech.com [online], "Genesis Corn", retrieved on Oct. 2019, <https://www.arr-tech.com/img/products/1.pdf>, 2 pages.

[No Author Listed] [online], "Tostada, Contadora de Tostada", retrieved on Oct. 7, 2019, <https://www.youtube.com/watch?v—sizc7mgHTVw>, 1 page [Video Submission].

[No Author Listed] [online], "Flatbread", retrieved on Dec. 3, 2019, <https://en.wikipedia.org/w/index.php?titie=Flatbread&oldid=924015547>, 7 pages.

Lawrence Equipment [online], "Corn Counter Stacker", retrieved on Oct. 4, 2019, <https://www.lawrenceequipment.com/product_detail.php?prod_id=65>, 2 pages.

Lawrence Equipment [online], "Mega 52 OP/AL System & Mega Twin In-Line", retrieved on Oct. 4, 2019, <https://www.lawrenceequipment.com/product_detail.php?item_id=59&num=4&eqtype>, 3 pages [Video Submission].

Sigma Equipment [online], "Used JC Ford JCF 6C CSPS Tortilla Counter and Stacker", retrieved on Aug. 23, 2019, <https://www.sigmaequipment.com/equipment/used/jc-ford-jcf-6c-csps-58528> 3 pages.

* cited by examiner

SELF-CLEARING COUNTER-STACKER WITH STACKING FRAME

BACKGROUND

Examples of comestible products are flatbreads, which include, for example, tortillas, pita bread, pizza crusts, chapati, and naan. Flatbreads can be made by hand or with automated equipment. For example, a factory can produce one or more types of flatbread. Factories can use partially or fully automated systems to produce flatbread. Automated methods to form flatbread can include, for example, die cutting, sheeting, and pressing of flatbread dough.

Factories can include different types of tools or equipment for the different stages in the production process, such as a mixer, a press, and an oven. Some production lines have tools to form flatbread dough into a ball and other tools to flatten the dough for baking. The flattened dough can have a circular shape and a specific thickness so the flatbread will have a desired thickness after baking.

SUMMARY

In general, one aspect of the subject matter described in this specification can be embodied in systems that includes a counter-stacker that includes: a support frame; a stacking frame defining one or more apertures therein and adapted to enable a comestible to move through the one or more apertures such that the comestible substantially maintains its shape; one or more stacking platforms coupled to the support frame, each of the one or more stacking platforms (i) adapted to extend into a respective one of the one or more apertures, (ii) having an upper surface adapted to support a plurality of comestibles, and (iii) adapted to move relative to a conveyor to place the plurality of comestibles supported by the upper surface on the conveyor when a quantity of comestibles satisfies a threshold quantity; a sensor adapted to detect a quantity of the comestibles on the upper surface of at least one of the one or more stacking platforms; and one or more actuators coupled to the stacking frame and the support frame and adapted to rotate the stacking frame to cause removal of a non-conforming comestible from the counter-stacker. Other embodiments of this aspect include corresponding methods, computer systems, apparatus, computer program products, and computer programs recorded on one or more computer storage devices, each configured to perform the actions of the systems.

In general, one aspect of the subject matter described in this specification can be embodied in methods that include the actions of receiving, on an upper surface of an upper conveyor included in a counter-stacker, a first comestible; transferring, by the counter-stacker that includes a stacking frame and a stacking platform and while the first comestible substantially maintains its shape, the first comestible through an aperture defined within the stacking frame and onto the stacking platform; creating, by the counter-stacker, a stack of comestibles that includes the first comestible and has a threshold quantity; receiving, on the upper surface of the upper conveyor, a second comestible; rotating, by one or more actuators included in the counter-stacker that are coupled to the stacking frame, the stacking frame to cause the second comestible to fall onto an upper surface of a lower conveyor; and removing, by the lower conveyor, the second comestible from the counter-stacker. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the counter-stacker can include the conveyor coupled to the support frame and adapted to (i) move in a first direction to remove a comestible from an upper surface of one of the one or more stacking platforms and (ii) move in a second direction to remove the non-conforming comestible from the counter-stacker. The system can include a non-conforming comestible removal device adapted to receive the non-conforming comestible from the conveyor. The system can include a reject conveyor adapted to receive the non-conforming comestible from the conveyor and transfer the non-conforming comestible to the non-conforming comestible removal device. The non-conforming comestible removal device can be a conveyor, or a cart.

In some implementations, the conveyor is adapted to (i) move in the first direction along a plane to remove the comestible, which substantially maintains its shape while moving through one of the one or more apertures, from the upper surface of one of the one or more stacking platforms and (ii) move in the second direction that is opposite the first direction along the plane to remove the non-conforming comestible from the counter-stacker. The conveyor can be adapted to remove a stack of comestibles that has the threshold quantity from the upper surface of the one or more stacking platforms. The counter-stacker can include a support adapted to remove a comestible from the conveyor before the conveyor moves in the second direction to remove the non-conforming comestible from the counter-stacker. The conveyor can include a plurality of belts adapted to support comestibles. The counter-stacker can include a plurality of supports including the support adapted to move between two adjacent belts from the plurality of belts to support a comestible to enable the conveyor to move in the second direction to remove the non-conforming comestible from the counter-stacker.

In some implementations, the one or more actuators can be adapted to rotate the stacking frame between 90 and 180 degrees. The counter-stacker can include a conveyor coupled to the support frame and adapted to transfer comestibles from the plurality of comestibles to one of the one or more apertures in the stacking frame. The counter-stacker can include a transfer device coupled to the support frame that is adapted to (i) receive a comestible from a prior processing device and (ii) transfer the comestible to the conveyor. The counter-stacker can include one or more second actuators adapted to rotate the transfer device between 60 and 180 degrees. The transfer device can include one or more second actuators adapted to rotate the transfer device to a reject position to prevent the transfer device from receiving a comestible from the prior processing device. The one or more second actuators can be adapted to rotate the transfer device to the rejection position concurrently with the rotation of the stacking frame by the one or more actuators that causes removal of the non-conforming comestible from the counter-stacker. The transfer device can be adapted to align a comestible with a processing lane. The transfer device can include an air blower that is adapted to align the comestible with the processing lane.

In some implementations, the sensor can be adapted to detect whether a comestible on the counter-stacker is not aligned with a processing lane in the counter-stacker. At least one of the one or more actuators can be adapted to rotate the stacking frame upon detection of a non-conforming comestible by the sensor. The sensor can be adapted to detect that a comestible is stalled on the stacking frame. The sensor can be an infrared sensor. The sensor can be a camera. The sensor can include a plurality of sensors including one or more counting sensors that are adapted to detect a quantity of the comestible and are separate sensors from one or more non-conforming comestible sensors that are adapted to detect whether a comestible on the counter-stacker is non-conforming. The counter-stacker can be adapted to receive a plurality of comestibles previously processed in a pressing system that forms the plurality of comestibles according to a pressing pattern. Each lane in the pressing pattern can correspond to a processing lane in the counter-stacker and one of the one or more apertures. The system can include the pressing system. The counter-stacker can have two or more processing lanes. The counter-stacker can include, for each processing lane of the two or more processing lanes, a stacking frame with an aperture.

In some implementations, the method can include transferring, by the counter-stacker, the stack of comestibles to another device. Transferring the stack of comestibles can include transferring, by the lower conveyor moving in a first direction, the stack of comestibles to a bagger. Removing, by the lower conveyor, the second comestible from the counter-stacker can include: moving, by the lower conveyor moving in a second direction, the second comestible onto a reject conveyor; and removing, by the reject conveyor, the second comestible from the counter-stacker. The method can include: receiving, by a transfer device included in the counter-stacker, the second comestible; transferring, by the counter-stacker, the second comestible from the transfer device to the stacking frame; rotating the transfer device; and initiating reversal of the direction of movement of the lower conveyor from the first direction to the second direction after rotation of the transfer device begins. The method can include: receiving, by a transfer device included in the counter-stacker, the second comestible; transferring, by the counter-stacker, the second comestible from the transfer device to the stacking frame; rotating the transfer device; and initiating reversal of the direction of movement of the lower conveyor from the first direction to the second direction substantially concurrently with a beginning of rotation of the transfer device. The method can include: determining, by the counter-stacker using a sensor and a controller, a quantity of comestibles in the stack of comestibles; and determining that the quantity of comestibles satisfies a threshold quantity. Transferring the stack of comestibles to another device can be responsive to determining that the quantity of comestibles satisfies the threshold quantity.

In some implementations, removing the second comestible from the counter-stacker can include transferring the second comestible to a non-conforming comestible removal device. Removing the second comestible from the counter-stacker can include: transferring, by the lower conveyor, the second comestible to a reject conveyor included in the counter-stacker; and transferring, by the reject conveyor, the second comestible to a non-conforming comestible removal device. Rotating the stacking frame can include rotating the stacking frame between 90 and 180 degrees to cause the second comestible to fall onto the lower conveyor. The method can include: lowering, by the counter-stacker, the stacking frame to place the stack of comestibles onto an upper surface of the lower conveyor; moving, by the counter-stacker, the lower conveyor to displace the stack of comestibles from a first location above the stacking frame to a second location above a holding platform; and placing, by the counter-stacker, the stack of comestibles on an upper surface of the holding platform by raising the holding platform. Either or both of rotating the stacking frame to cause the second comestible to fall onto an upper surface of a lower conveyor and removing the second comestible from the counter-stacker can occur while the stack of comestibles is on the upper surface of the holding platform. The method can include: receiving, by a transfer device included in the counter-stacker, the second comestible; transferring, by the counter-stacker, the second comestible from the transfer device to the stacking frame; and rotating the transfer device. Lowering the stacking frame can begin after rotation of the transfer device begins. The method can include: receiving, by a transfer device included in the counter-stacker, the second comestible; transferring, by the counter-stacker, the second comestible from the transfer device to the stacking frame; and rotating the transfer device. Lowering the stacking frame can begin substantially concurrently with a beginning of rotation of the transfer device.

In some implementations, the method can include detecting, by the counter-stacker and using a sensor and a controller, a non-conforming comestible on the counter-stacker. Rotating the stacking frame can be responsive to detecting the non-conforming comestible on the counter-stacker. Detecting the non-conforming comestible can include determine that the second comestible is non-conforming. The method can include: receiving, by a transfer device included in the counter-stacker, the second comestible; transferring, by the counter-stacker, the second comestible from the transfer device to the upper conveyor; and rotating, by one or more second actuators included in the counter-stacker that are coupled to the transfer device, the transfer device to cause removal of any comestibles on the transfer device from the counter-stacker. Rotating the stacking frame to cause the second comestible to fall onto an upper surface of a lower conveyor can begin after rotation of the transfer device begins. Rotating the stacking frame to cause the second comestible to fall onto an upper surface of a lower conveyor can begin substantially concurrently with a beginning of rotation of the transfer device. The method can include detecting, by the counter-stacker and using a sensor and a controller, a non-conforming comestible on the counter-stacker. Either or both of rotating the stacking frame and rotating the transfer device can be responsive to detecting the non-conforming comestible on the counter-stacker. Rotating the transfer device can include rotating the transfer device between 60 and 180 degrees to cause removal of any comestibles on the transfer device from the counter-stacker.

In some implementations, the method can include: receiving, by a transfer device included in the counter-stacker, the first comestible; aligning, by the transfer device, the first comestible with a processing lane in the counter-stacker; and transferring, by the counter-stacker, the first comestible from the transfer device to the upper conveyor. Aligning the first comestible with the processing lane in the counter-stacker can include blowing, by an air blower in the transfer device, a jet of air onto the bottom of the first comestible to align the first comestible with the processing lane in the counter-stacker. Blowing the jet of air onto the bottom of the first comestible to align the first comestible with the processing lane in the counter-stacker can include aligning, by a guide included in the transfer device, the first comestible with the processing lane in the counter-stacker after the air blower blows the jet of air onto the bottom of the first comestible.

In some implementations, the method can include: pressing, by a press, the first comestible according to a pressing pattern; and transferring, by a system that includes the press and the counter-stacker, the first comestible from the press and to the counter-stacker. The first comestible can be pressed in a processing lane from a plurality of processing lanes for the pressing pattern. Transferring the first comestible from the press and to the counter-stacker can include: transferring, by the system and along the processing lane, the first comestible from the press to an oven included in the system; transferring, by the system and along the processing lane, the first comestible from the oven to a cooler included in the system; transferring, by the system and along the processing lane, the first comestible from the cooler to a monitoring station included in the system; and transferring, by the system and along the processing lane, the first comestible from the monitoring station to the counter-stacker. Transferring the first comestible through an aperture defined within the stacking frame and onto the stacking platform can include transferring, by the counter-stacker and along the processing lane, the first comestible through the aperture defined within the stacking frame that corresponds to the processing lane.

In some implementations, the method can include reversing a direction of the upper conveyor from a first direction to a second direction while removing the second comestible from the counter-stacker. The method can include: receiving, by a transfer device included in the counter-stacker, the second comestible; transferring, by the counter-stacker, the second comestible from the transfer device to the stacking frame; and rotating the transfer device. Reversing the direction of the upper conveyor can begin after rotation of the transfer device begins. The method can include: receiving, by a transfer device included in the counter-stacker, the second comestible; transferring, by the counter-stacker, the second comestible from the transfer device to the stacking frame; and rotating the transfer device. Reversing the direction of the upper conveyor can begin substantially concurrently with a beginning of rotation of the transfer device.

The subject matter described in this specification can be implemented in various ways and may result in one or more of the following advantages. In some implementations, the systems and methods described in this document can reduce counter-stacker downtime, increase throughput, or both, e.g., by removing a non-conforming comestible from the counter-stacker more quickly than in prior systems. The systems and methods described in this document can increase system throughput by reducing downtime during which other comestibles are stalled or jammed in the counter-stacker and the counter-stacker is unable to stack new comestibles in a processing lane, e.g., or in all of the processing lanes. In some implementations, the systems and methods described in this document can reduce a quantity of rejected comestibles. For instance, when a counter-stacker more quickly removes a non-conforming comestible from the counter-stacker, the systems and methods described in this document can reduce a quantity of other comestibles that get jammed in the counter-stacker because of the non-conforming comestible.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
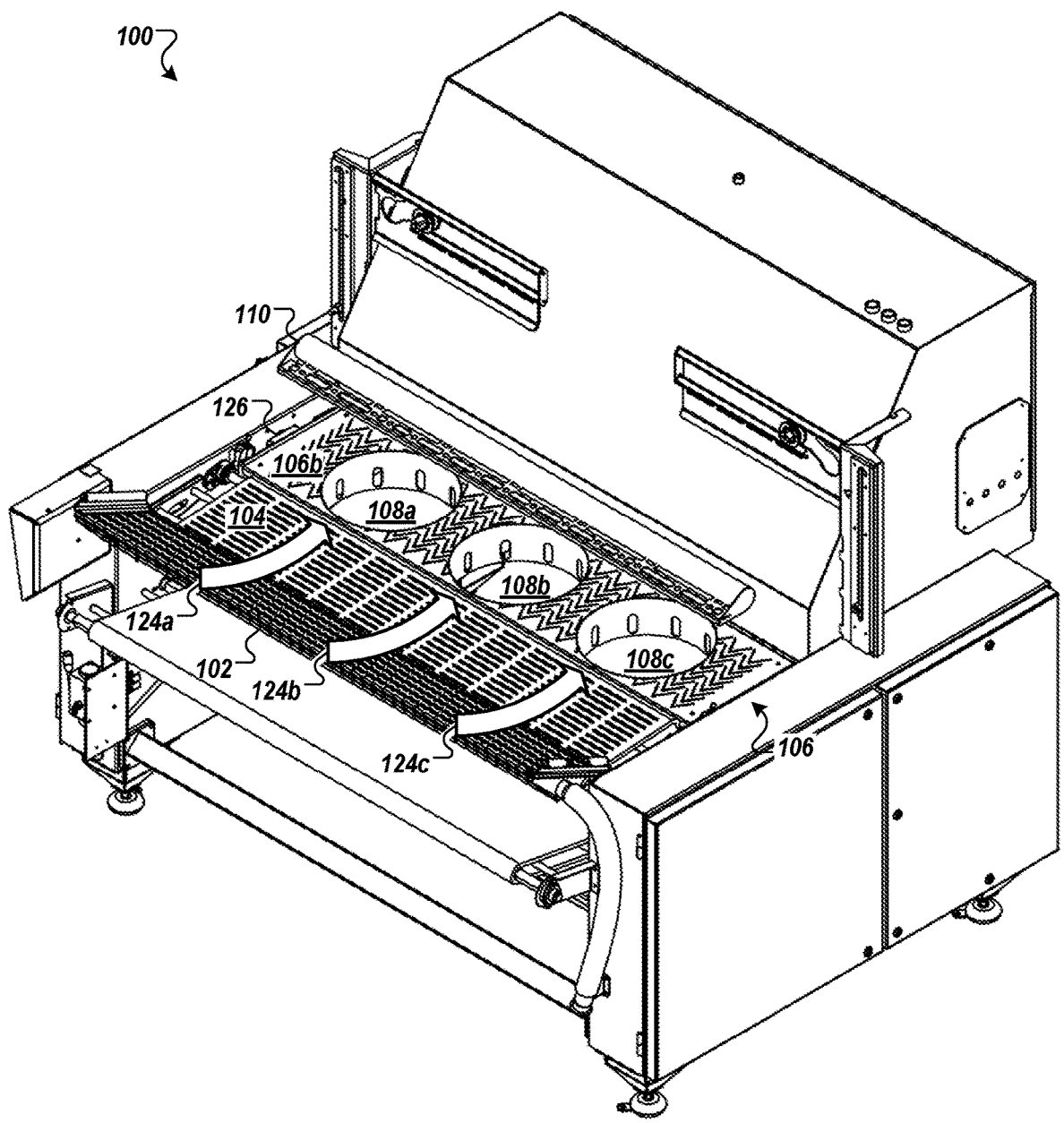
FIGS. 1A-C depict an example counter-stacker in a stacking position.

A system that makes comestible flatbread products, such as tortillas, can include multiple components. Such components include a mixer to create a batter, a former to create a comestible ball from the batter, a press to form a flattened comestible, an oven to bake the flattened comestible, and a cooler to reduce the temperature of the baked comestible. The system also includes a monitoring station that determines whether a cooled comestible conforms to predetermined criteria, such as roundness and size, e.g., diameter. The system includes a counter-stacker that creates stacks of comestibles. The stacks can each have the same or different quantities of comestibles per stack. For instance, each stack can have twenty comestibles or some stacks can have twenty comestibles while other stacks have ten comestibles. Once a comestible stack is created, the system bags the comestible stack, e.g., using a bagger.

A counter-stacker can include multiple apertures, e.g., catch cups, located in a stacking frame of the counter-stacker. A conveyor, such as a belt, can be used to transfer comestibles into the multiple apertures of the counter-stacker. When a comestible on the conveyor does not align with an aperture, e.g., is non-conforming, the comestible can stall on top of the stacking frame. The stalled comestible can then prevent other comestibles from moving through the aperture. For example, once a comestible is stalled on the stacking frame and the conveyor continues to move other comestibles toward the aperture, the other comestibles can get jammed on the initially stalled comestible.

To remove one or more stalled comestibles, one or more jammed comestibles, or a combination of both, from the counter-stacker, the counter-stacker includes one or more actuators coupled to the stacking frame. The one or more actuators are in communication with one or more sensors of sensor system coupled with the counter-stacker. When a comestible jams on the stacking frame, one or more sensors of sensor system can detect the presence of the jammed comestible. When the one or more sensors of sensor system detect a jammed comestible(s), the counter-stacker rotates the one or more actuators, causing the stacking frame to rotate and remove the jammed comestible(s) from the counter-stacker. For instance, when the stacking frame rotates, the jammed comestible(s) drop onto a lower conveyor that normally moves in the direction of the discharge with stacked comestibles but for the function of removing previously stalled comestible(s), jammed comestible(s), or both, reverses direction moving the previously stalled comestible(s), jammed comestible(s), or both, toward an edge of the counter-stacker. For example, the lower conveyor moves the comestible(s) to a dedicated reject conveyor that then removes the previously stalled comestible(s), previously jammed comestible(s), or both from the counter-stacker.

The counter-stacker can also include a rotatable infeed transfer device that the counter-stacker uses to prevent additional comestibles from entering the counter-stacker while the counter-stacker removes the one or more stalled comestibles, one or more jammed comestibles, or both. For instance, when the counter-stacker determines that a comestible is stalled or jammed, the counter-stacker can rotate the transfer device. Concurrently with or subsequent to rotation of the transfer device, the counter-stacker can rotate the stacking frame to remove the stalled or jammed comestible(s), or both, from the counter-stacker. In addition to the stalled or jammed comestible(s), or both, there may be one or more comestibles on the conveyor that are in process of becoming jammed due, in part, to their presence on the conveyor. These "likely to become jammed" comestibles can also be removed from the counter-stacker through rotation of the stacking frame, the transfer device, or both. Once all of the stalled, jammed and likely to become jammed comestibles are on the lower conveyor or removed from the counter-stacker, the counter-stacker can rotate the transfer device and the stacking frame back to a stacking position to process additional comestibles.

Figure 1B:
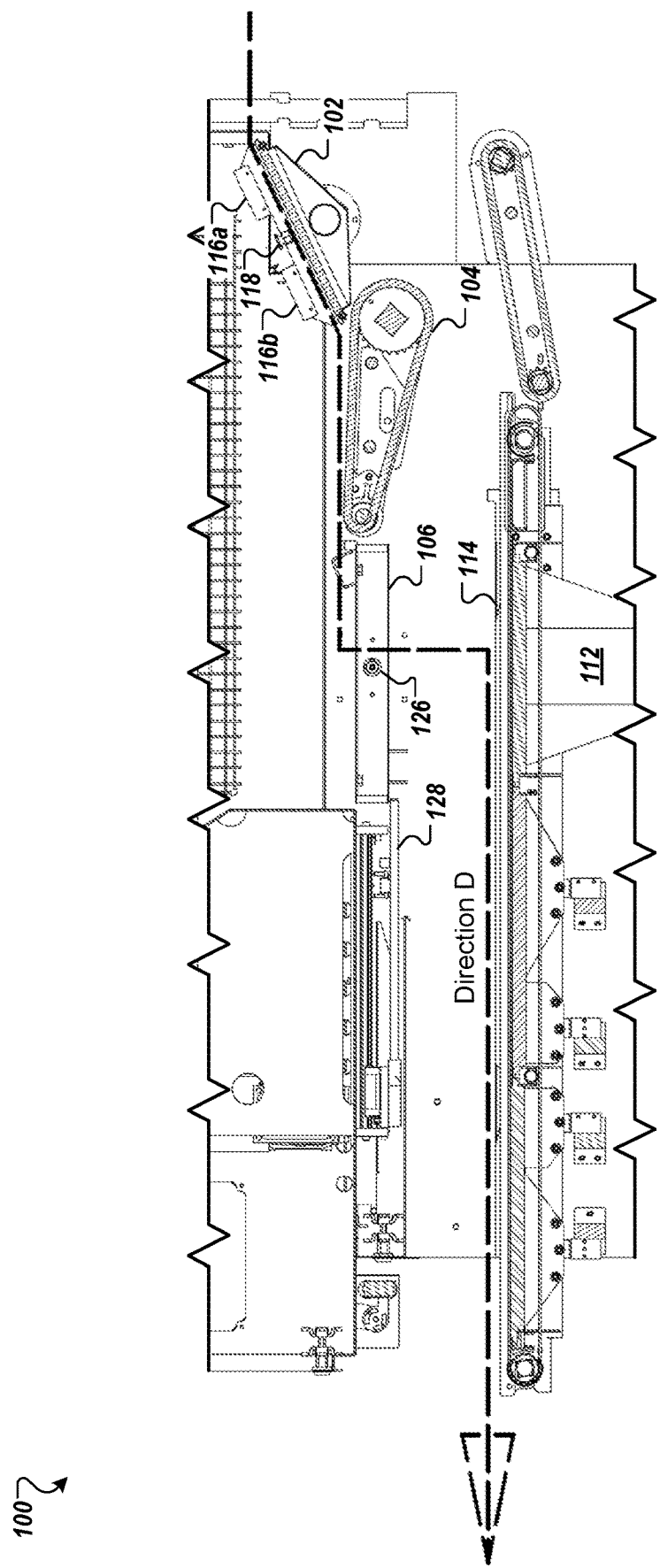
Figure 1C:
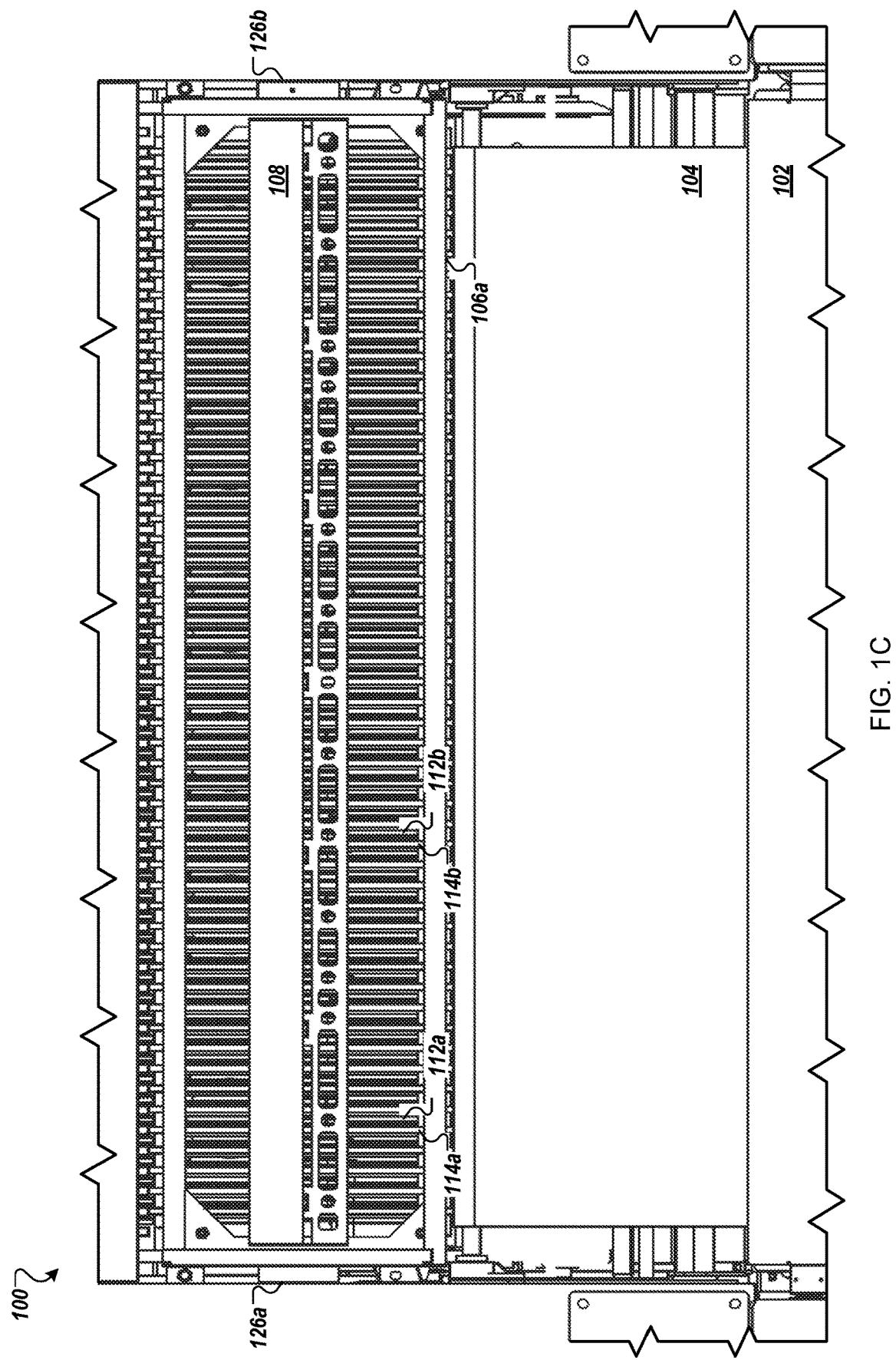

FIGS. 1A-C depict an example counter-stacker 100 in a stacking position. The counter-stacker 100 includes a transfer device 102 that receives comestibles from another processing device, e.g., a monitoring station (not shown). The transfer device 102 can transfer the received comestibles to an upper conveyor 104.

The transfer device 102 has a number of processing lanes 124a-c that correspond to apertures 108a-c formed in the stacking frame 106, the number of which varies based on the counter-stacker 100's configuration. For instance, when a system that includes the counter-stacker 100 has a pressing pattern of 3×3 or 3×4 at a press, which numbers correspond to a longitudinal axis in the direction D (FIG. 1B) of comestible movement and a latitudinal axis that is normal to the longitudinal axis, respectively, the transfer device 102 has three processing lanes 124a-c along longitudinal axes and the frame 106 has three apertures 108a-c positioned along the latitudinal axis.

In some examples, the system can be configured for a different number of processing lanes 124a-c. For example, the pressing pattern of the press can be changed to a 3×3, 4×4, 5×5, 5×6, 6×5, 6×6, 7×7 or 8×8 pressing pattern by configuring the press accordingly. Similarly, the counter-stacker 100 would be configured for the pressing pattern by configuring the stacking frame 106 with the appropriate number of apertures 108a-c, such as four, five, or six apertures, and so on. The stacking frame 106 can include an outer frame 106a (FIG. 1C) and a removable inner frame 106b (FIG. 1A), the latter of which is adjustable based on the pressing pattern. In FIG. 1A, the removable inner frame is configured for three processing lanes 124a-c. Other removable inner frames can be configured for four lanes, five lanes, six lanes, or another appropriate number of lanes depending on the pressing pattern being used.

The outer frame 106a is coupled to one or more actuators 126 that enable rotation of the stacking frame 106. For example, the outer frame 106a can couple with two actuators 126a-b (FIG. 1C), one disposed on either side of the stacking frame 106 and separated from each other along a latitudinal axis.

In operation, and with reference initially to FIG. 1B, the upper conveyor 104 receives a comestible from the transfer device 102 and moves the comestible in a longitudinal direction D toward the stacking frame 106. The upper conveyor 104 may receive one comestible for each of the processing lanes 124a-c at substantially the same time from the transfer device 102. The upper conveyor 104 may receive, from the transfer device 102, comestibles for only some of the processing lanes 124a-c at substantially the same time. For instance, when the monitoring station removes a comestible from one of three processing lanes 124a-c, the transfer device 102 might receive only two comestibles at substantially the same time (or, in other words, only two comestibles across the three processing lanes 124a-c). The upper conveyor 104 would then receive only the two comestibles at substantially the same time. When the upper conveyor 104 receives comestibles from the transfer device 102, the upper conveyor 104 might be moving other comestibles toward the stacking frame 106 that were previously received from the transfer device 102 as part of the continuous operating process of the counter-stacker 100.

The upper conveyor 104 transfers comestibles into the apertures 108a-c of the stacking frame 106. As the comestible(s) pass through the apertures 108a-c, the comestibles transfer onto one or more stacking platforms 112 when the one or more stacking platforms 112 are extended into or just below one of the apertures 108a-c. For example, the upper conveyor 104 may transfer a comestible into a processing lane 124a that feeds into the aperture 108a and onto a corresponding position on the stacking platform 112 when stacking platform 112 extends into or is located just below the aperture 108a.

The stacking platforms 112 can be operated individually from each other. For instance, when a first stacking platform 112 extends into or below one of the apertures 108a-c, a second stacking platform 112 may be moving downward, away from the apertures 108a-c, moving upward, toward the apertures 108a-c, or remaining stationary. Other stacking platforms 112, e.g., a third stacking platform 112, may be doing something else entirely from the first stacking platform 112 and the second stacking platform 112. Some of the examples described in this document reference a single stacking platform 112 for clarity but the same configuration, process, or both, can apply to other stacking platforms concurrently or at different times.

Transfer of the comestibles from the upper conveyor 104 onto the stacking platforms 112 can substantially maintain the shape of the comestibles. For instance, when the upper conveyor 104 transfers substantially flat comestibles, e.g., flatbread, onto the stacking platforms 112, the transfer can substantially maintain the substantially flat shape of the comestibles. The counter-stacker 100 can thus be adapted to place comestibles that substantially do not have a wrinkle, a fold, a crease, or combinations of two or more of these, on the stacking platforms 112.

A comestible that has a wrinkle, fold, a crease, or a combination of two or more of these, might be a non-conforming comestible that the counter-stacker 100 does not place on the stacking platforms 112. For instance, as described in more detail below with reference to FIGS. 2A-B, the counter-stacker 100 might remove such a non-conforming comestible from the counter-stacker 100.

As the upper conveyor 104 transfers comestibles onto a single stacking platform 112, a sensor system 110 can detect the comestibles placed on the single stacking platform 112. A controller can receive data from the sensor system 110 and count the number of comestibles placed on the single stacking platform 112. The counter-stacker 100, e.g., the controller, can perform this analysis for each of the stacking platforms 112.

When the controller, e.g., a data processing apparatus, determines that the number of comestibles on a single stacking platform 112 satisfies a threshold quantity, e.g., is the same as the threshold quantity or greater than the threshold quantity, the controller can cause the single stacking platform 112 to transfer the stacked comestibles to a lower conveyor 114. As an example, when the threshold quantity is twenty and the controller determines that a stack of twenty comestibles are on a single stacking platform 112, the controller can send a signal, e.g., to an actuator, to cause the single stacking platform 112 to retract away from the aperture 108a. The single stacking platform 112 can move downward, away from the stacking frame 106 and toward the lower conveyor 114. The single stacking platform 112 transfers the comestible stack onto the lower conveyor 114 as an upper surface of the stacking platform 112, which supports the comestible stack, moves below the lower conveyor 114. The counter-stacker 100 performs this process for each of the stacking platforms 112 individually. In some examples, the counter-stacker 100 can determine that two of the stacking platforms 112 each satisfy the threshold quantity at substantially the same time.

In some implementations, a single stacking platform 112, e.g., each of the stacking platforms or multiple stacking platforms, the lower conveyor 114, or both, can include multiple components. For example, a single stacking platform 112 may include multiple blades or supports 112a-b, depicted in FIG. 1C, that extend between belts 114a-b that form the lower conveyor 114. The number of blades 112a-b used for a single stacking platform 112 can be configured based on the number of processing lanes 124a-c, e.g., the pressing pattern for the system. The number of blades can be based on a desired width for a comestible for the pressing pattern.

The counter-stacker 100 can include one or more transfer forks 128 (FIG. 1B) onto which the upper conveyor 104 places comestibles while a single stacking platform 112 transfers comestibles onto the lower conveyor 114. For instance, the upper conveyor 104 can transfer comestibles through the aperture 108a and onto one or more transfer forks 128, located below the stacking frame 106, while the single stacking platform 112 is retracted away from the aperture 108a.

When the stack of comestibles is no longer above the stacking platform 112, the counter-stacker 100 can extend the stacking platform 112 into or just below the aperture 108a, e.g., into a loading position. During the process of extending the stacking platform 112, the counter-stacker 100 can move any comestibles from one or more corresponding transfer forks 128 and onto the stacking platform 112.

The lower conveyor 114 can transfer a stack of comestibles along a longitudinal axis in the direction D as shown in FIG. 1B. When the upper surface of a single stacking platform 112 is below an upper surface of the lower conveyor 114, and a stack of comestibles is transferred from the single stacking platform 112 to the upper surface of the lower conveyor 114, the lower conveyor 114 can move the stack of comestibles so that the stack of comestibles is no longer above the single stacking platform 112. The lower conveyor 114 can transfer a stack of comestibles to a subsequent processing device, e.g., a bagger. As discussed above, each of the stacking platforms 112 can move independently from the others. As a result, the counter-stacker 100 can lower two stacking platforms 112 at substantially the same time to transfer corresponding comestible stacks from the two stacking platforms 112 onto the lower conveyor 114. In some examples, the counter-stacker 100 lowers only one stacking platform 112, while the other stacking platforms 112 remain in a corresponding aperture 108a-c, move upward, or both.

In some implementations, the transfer device 102 can include one or more components that can align a comestible with a processing lane 124a-c. The number of guides 116a-b in the transfer device 102 can be configured based on the pressing pattern for the system and the number of processing lanes. For example, the transfer device 102 can include, for a processing lane 124a-c, one or two guides 116a-b, an air blower 118, or both. The transfer device 102 can include one guide 116a-b on either side of the processing lane. In some examples, the transfer device 102 can include two guides 116a-b on either side of the processing lane, e.g., a first guide 116a further from the upper conveyor 104 and a second guide 116b closer to the upper conveyor 104, as shown in FIG. 1B.

In these implementations, the air blower 118 can blow an air jet through apertures, e.g., small apertures, in a plate included in the transfer device 102. The air blower 118 is located below the plate in the transfer device 102. The air jet contacts a lower surface of a comestible as the comestible moves over the transfer device 102. The guides 116a-c include angled sides adapted to guide the comestible toward a center of corresponding processing lane. The jet of air can reduce friction between the comestible and the transfer device 102 to increase a likelihood that the guides 116a-b, or the guide closest to the comestible, direct the comestible toward the center of the processing lane 124a-c. The use of a guide 116a-b, an air blower 118, or both, may reduce non-conforming comestibles in the counter-stacker 100 or counter-stacker 100 downtime; or may increase counter-stacker 100 throughput; or a combination of these.

The sensor system 110 can include any appropriate number and type of sensors. For example, the sensor system 110 can include one sensor for each of the apertures 108a-c. The sensor system 110 can include one sensor for the maximum number of apertures allowable for the counter-stacker 100. The sensors can be optical sensors, e.g., infrared, cameras, mechanical sensors, or a combination of two or more of these. In some examples, the sensors can be motion sensors. When the counter-stacker 100 includes mechanical sensors, the sensors may be in the stacking frame 106, e.g., near the apertures 108a-c.

In some implementations, the sensor system 110 has a configurable number of sensors. For instance, the sensor system 110 can be detachably coupled to the counter-stacker 100. When the counter-stacker 100 is configured for a different pressing pattern, the sensor system 110 and the removable inner frame of the stacking frame 106 can be changed for the different pressing pattern. In these examples, the sensor system 110 can have one or more sensor(s) for each of the apertures 108a-c.

The sensor system 110 can monitor the apertures 108a-c to determine a quantity of comestibles in a stack. For example, the sensor system 110 can monitor a color of the aperture 108a to count a number of comestibles in a stack on a stacking platform that corresponds to the aperture 108a. When the sensor system 110 detects a change in color, e.g., from a darker color for the aperture 108a to a lighter color for a comestible, the sensor system 110 can increment a count for the aperture 108a.

In some implementations, the stacking frame 106 can oscillate. For instance, the stacking frame 106 oscillates to make a stack of comestibles more concentric. Oscillation of the stacking frame 106 can make a stack of comestibles look more uniform, e.g., help align the centers of the comestibles in the stack along a vertical axis, perpendicular to the longitudinal axis, the latitudinal axis, or both.

Figure 2A:
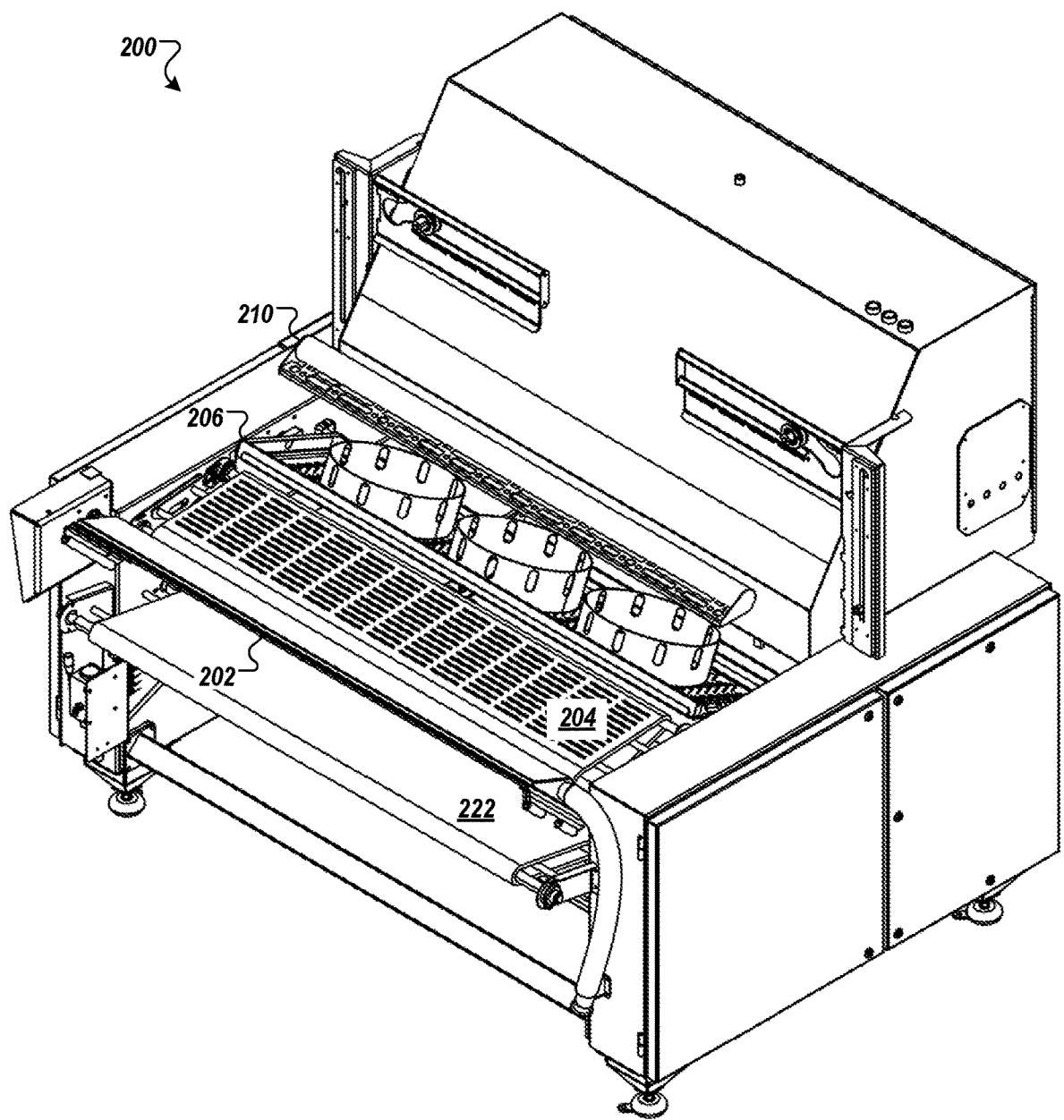
FIGS. 2A-B depict an example counter-stacker in a clearing position.
Figure 2B:
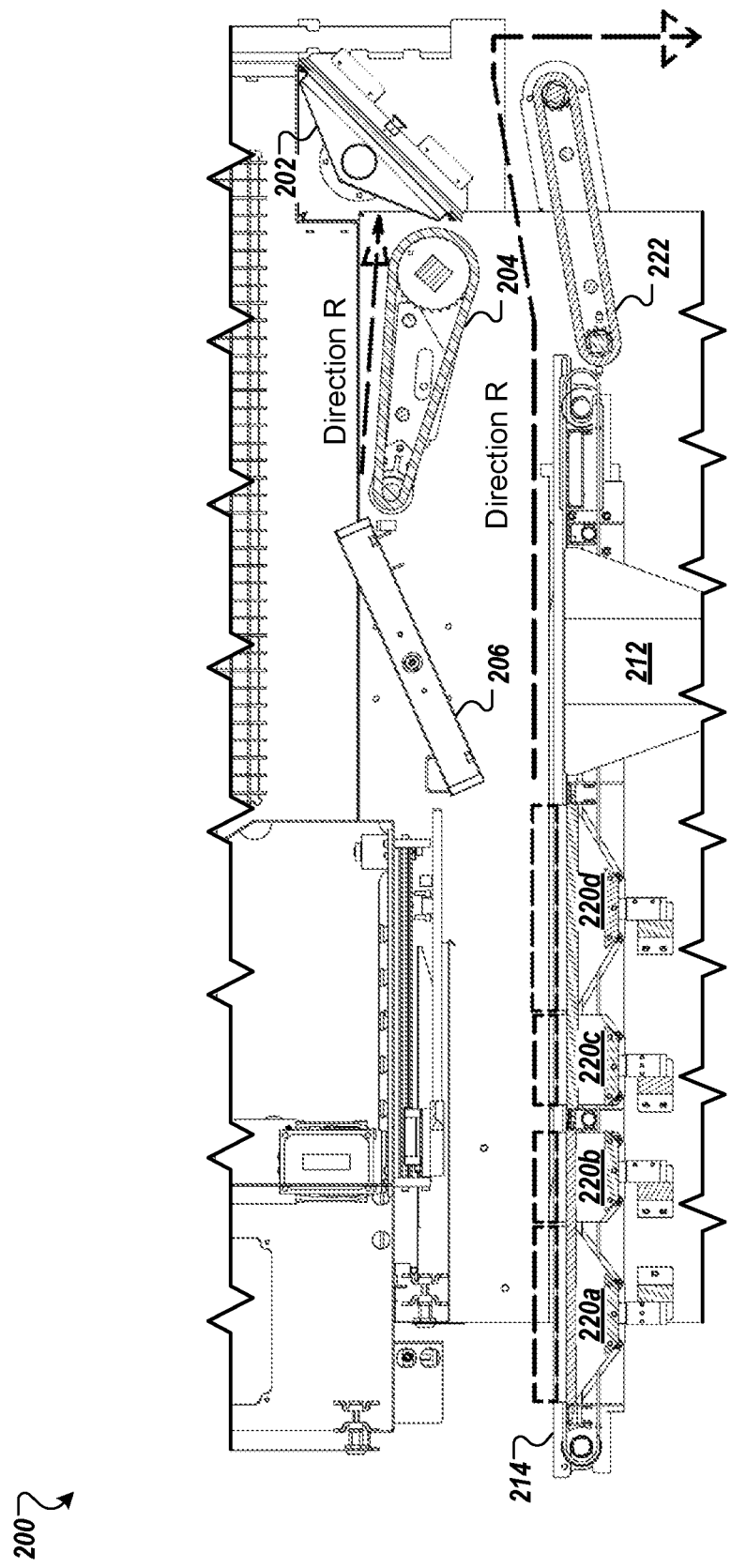

FIGS. 2A-B depict an example counter-stacker 200 in a clearing position. When the counter-stacker 200 detects a non-conforming comestible, the counter-stacker 200 may switch from the stacking position, described with reference to FIGS. 1A-C, to the clearing position shown in FIGS. 2A-B.

The sensor system 210 in the counter-stacker 200 can include one or more sensors adapted to detect a non-conforming comestible. A non-conforming comestible may include a misaligned comestible, a stalled comestible, a jammed comestible, a comestible in a pile of two or more comestibles, or a combination of two or more of these. When the counter-stacker 200 detects a non-conforming comestible, the counter-stacker 200, e.g., a controller in the counter-stacker 200, can send a signal to an actuator for the transfer device 202, an actuator for the stacking frame 206, or both, to cause the respective component to rotate.

A misaligned comestible may be a comestible on the upper conveyor 204 or another portion of the counter-stacker 200 that is not centered on or within a threshold distance of being centered on a processing lane for a current counter-stacker configuration, e.g., based on a pressing pattern. A misaligned comestible may be a comestible for which the counter-stacker 200 determined that the comestible satisfies at least a threshold likelihood of being misaligned, at least a threshold likelihood that the comestible will not pass through an aperture while substantially maintaining its shape, or both.

A stalled comestible may be a comestible on an upper surface of the stacking frame 206 that did not move partially or completely through an aperture in the stacking frame 206. For instance, a stalled comestible is a comestible in contact with the stacking frame 206, e.g., other than the inside of the apertures, that was not placed directly or indirectly on a stacking platform 212. A comestible is placed directly on the stacking platform 212 when it contacts an upper surface of the stacking platform 212. A comestible is placed indirectly on the stacking platform 212 when one or more other comestibles, e.g., in a stack, are between the comestible and an upper surface of the stacking platform 212. The stalled comestible might not have substantially maintained its shape during transfer from the upper conveyor 204 to a stacking platform 212. For instance, a stalled comestible may be partially on an upper surface of the stacking frame 206 and partially in an aperture of the stacking frame 206.

A jammed comestible may be a comestible that contacts another comestible, e.g., a stalled comestible or another jammed comestible. A jammed comestible can include a comestible that is caught, trapped, stuck, or a combination of two or more of these, on the stacking frame 206.

Multiple comestibles can form a pile, e.g., of two or more comestibles, in a component of a system that processes comestibles prior to the counter-stacker 200. When the pile of comestibles was not properly rejected by a component prior to the counter-stacker 200, the pile can enter the counter-stacker 200 and cause a jam. For instance, a pile may include two comestibles laying on top of each other, e.g., in a pile that was inadvertently formed in a device of a comestible processing system prior to the counter-stacker 200.

The counter-stacker 200, e.g., a controller in the counter-stacker, can receive data from the sensor system 210. The data can indicate detection of a non-conforming comestible. In some examples, the counter-stacker 200 analyzes the data to determine whether the data identifies a non-conforming comestible. In some implementations, the sensor system 210 includes one or more image capturing devices, such as cameras. The counter-stacker 200 can receive an image from the one or more cameras in the sensor system 210. The image can be for a single processing lane or multiple processing lanes, e.g., all processing lanes. The counter-stacker 200 can detect a non-conforming comestible depicted in an image using a color of the comestible, e.g., when the comestible color is different from the color of the stacking frame 206, the upper conveyor, the transfer device 202, or a combination of two or more of these.

The counter-stacker 200 can analyze the received data to determine whether the data identifies a non-conforming comestible. For example, the counter-stacker 200 can use image processing for a received image to determine a comestible that is likely depicted in the image. The counter-stacker 200 can determine locations in the image for each of one or more processing lanes for the current pressing pattern. The counter-stacker 200 can compare a location for the comestible with the locations for the one or more processing lanes and determine whether the comestible is or is likely a non-conforming comestible.

When in the stacking position, the transfer device 202 can have a stacking position angle between 30° and 45° to a horizontal plane. The counter-stacker 200 can cause rotation of the transfer device 202 between 60° and 180° from the stacking position angle upon detection of a non-conforming comestible.

When in the stacking position, the stacking frame 206 can have a stacking position angle substantially parallel to a horizontal plane. The counter-stacker 200 can cause rotation of the stacking frame between 90° and 180° from the stacking position angle upon detection of a non-conforming comestible.

Rotation of the transfer device 202 can prevent other comestibles from entering the counter-stacker 200 and getting stalled or jammed, e.g., making a current jam worse, increasing an amount of comestibles that need to be removed from the counter-stacker, or both. Rotation of the stacking frame 206 can cause any non-conforming comestibles on the stacking frame 206 to fall off the stacking frame 206. The comestibles may fall onto the upper conveyor 204, the lower conveyor 214, or another component in the counter-stacker 200.

A data processing apparatus in the counter-stacker 200 can send a signal to the lower conveyor 214, or one or more actuators that move the lower conveyor 214, to cause the lower conveyor 214 to change a direction of rotation along a longitudinal axis. The signal can cause the lower conveyor 214 to move in a reverse direction R (FIG. 2B) that is the opposite direction from the forward direction D.

Because the lower conveyor 214 may support one or more comestible stacks when a non-conforming comestible is detected, the counter-stacker 200 can lift the comestible stacks off the lower conveyor 214 using one or more holding platforms 220a-d. A data processing apparatus in the counter-stacker 200 can send a signal to one or more actuators to cause the holding platforms 220a-d to move from below an upper surface of the lower conveyor 214 to above the upper surface of the lower conveyor 214, transferring comestible stacks off the lower conveyor 214. The holding platforms 220*a-d* can each include one or more blades or supports similar to the stacking platforms 212.

The counter-stacker 200 can raise all of the holding platforms 220*a-d*, some of the holding platforms 220*a-d*, or none. For instance, the counter-stacker 200 can include one or more additional sensors. The counter-stacker 200 can use the additional sensors to determine locations for comestible stacks on the lower conveyor 214. The counter-stacker 200 can then raise the holding platforms 220*a-d* that are at the comestible stack locations to lift the comestible stacks off the lower conveyor 214. When the counter-stacker 200 determines that the lower conveyor 214 is not supporting any comestible stacks, the counter-stacker 200 can determine to skip raising the holding platforms 220*a-d*, e.g., not raise any of the holding platforms 220*a-d*.

When the lower conveyor 214 moves in the reverse direction R, the lower conveyor 214 moves any comestibles still supported by the lower conveyor 214 onto a reject conveyor 222. For instance, when the counter-stacker 200 detects a non-conforming comestible, the counter-stacker 200 can raise one or more of the holding platforms 220*a-d*, rotate the stacking frame 206, and then reverse the lower conveyor 214. When the counter-stacker 200 rotates the stacking frame 206, any non-conforming comestibles on the stacking frame 206 fall onto the lower conveyor 214. When the lower conveyor 214 reverses direction, the lower conveyor 214 transfers the comestibles supported by the lower conveyor 214 onto the rejected conveyor 222.

In some examples, a single stacking platform 212 may support a comestible, or multiple comestibles, when the counter-stacker 200 detects a non-conforming comestible. These one or more comestibles are an incomplete comestible stack. In these examples, the counter-stacker 200 can lower the single stacking platform 212 to place the incomplete comestible stack onto the lower conveyor 214. When the lower conveyor 214 reverses direction, the lower conveyor 214 moves the incomplete comestible stack that was previously on the single stacking platform 212 onto the reject conveyor 222.

In some implementations, the counter-stacker 200 can temporarily move the incomplete comestible stack from the stacking platform 212 onto one of the holding platforms 220*a-d*, e.g., holding platform 220*d* closest to the stacking frame 206. Once the incomplete comestible stack is on the holding platform 220*d*, the counter-stacker 200 can reverse the lower conveyor 214 to move any comestibles that fell onto the lower conveyor 214, e.g., from the stacking frame 206 or the upper conveyor 204 or both, onto the reject conveyor 222. After the lower conveyor 214 is cleared of the comestibles that fell onto the lower conveyor 214, the counter-stacker 200 can lower the holding platforms 220*a-d* that support the incomplete comestible stack, e.g., the holding platform 220*d*, to move the incomplete comestible stack to a position above the retracted stacking platform 212. The counter-stacker 200 can raise the retracted stacking platform 212 and continue to add comestibles to the incomplete comestible stack, e.g., until the number of comestibles in the stack satisfies the threshold quantity.

Upon detection of a non-conforming comestible, the counter-stacker 200 can send a signal to the upper conveyor 204, or one or more actuators that move the upper conveyor 204, to cause the upper conveyor 204 to switch a direction of rotation along a longitudinal axis. The signal can cause the upper conveyor 204 to move in the reverse direction R. The change in rotational direction of the upper conveyor 204 causes the upper conveyor to move any comestibles on the upper conveyor 204 in the reverse direction R and onto the reject conveyor 222, the lower conveyor 214, or both.

In some implementations, the counter-stacker 200 maintains the upper conveyor in the forward direction D. For instance, when the counter-stacker 200 detects a non-conforming comestible, a data processing apparatus in the counter-stacker 200 might not send a signal to the upper conveyor 204, allowing the upper conveyor 204 to continue moving in the forward direction D.

The reject conveyor 222 can remove, from the counter-stacker 200, comestibles placed on the reject conveyor 222. For instance, the reject conveyor 222 can move in a longitudinal or latitudinal direction to remove comestibles from the counter-stacker 200. The reject conveyor 222, or the lower conveyor 214, can transfer the non-conforming comestibles to a non-conforming comestible removal device (not shown). The non-conforming comestible removal device can be another conveyor or a cart.

The reject conveyor 222 can move in a single direction. For example, the reject conveyor 222 can move in a single direction selected from the direction R, or another direction other than the direction D. In some implementations, the reject conveyor 222 cannot be reversed. In some examples, the reject conveyor 222 can move in a direction substantially perpendicular to the direction D, or at an angle away from the direction D, e.g., at a 135° angle away from the direction D.

The reject conveyor 222 can move comestibles onto another conveyor, into a bin, or otherwise remove comestibles from the counter-stacker 200. For instance, when the transfer device 202 receives comestibles from a monitoring station, the reject conveyor 222 can move comestibles onto a conveyor or into a bin used by the monitoring station. The monitoring station can move, onto the conveyor or into the bin, comestibles that do not conform to predetermined criteria, e.g., size, color, or both.

In some implementations, the reject conveyor 222 can move comestibles to another device that stacks the comestibles. The other device can place stacked comestibles into bags or transfer the stacked comestibles to the bagger that receives stacked comestibles from the counter-stacker 200.

In some implementations, the counter-stacker 200 does not include the reject conveyor 222. For instance, the lower conveyor 214 can remove comestibles from the counter-stacker 200 instead of the reject conveyor 222. In these implementations, the lower conveyor 214 can extend fully under the upper conveyor 204, partially or fully under the transfer device 202, or both. In some examples, the lower conveyor 214 does not extend fully under the upper conveyor 204, partially or fully under the transfer device 202, or both. In these examples, the counter-stacker 200 can place non-conforming comestibles into a bin or onto another conveyor.

The sensor system 210 can use data from the same sensors or different sensors to count comestibles in a stack and detect non-conforming comestibles. For example, the sensor system 210 can include one or more cameras that capture images that the counter-stacker 200 uses to both count comestibles in a stack and detect non-conforming comestibles. In some examples, the counter-stacker 200 can include an infrared sensor and a camera. The counter-stacker 200 can use infrared sensor data to count comestibles in a stack and camera data to detect non-conforming comestibles. In some implementations, the sensor system 210 can use a sensor that captures data for an area within an aperture 108*a-c*, shown in FIG. 1A, to count comestibles in a stack. The sensor system 210 can alternatively use a sensor that measures a thickness of comestibles within an aperture 108a-c to count comestibles in a stack.

The sensor system 210, and the sensor system 110, can use a sensor that captures data for an area around an aperture 108a-c, potentially excluding an aperture 108a-c, to determine whether a comestible is non-conforming. The sensor system 110 can capture data for every non-moving product around an area of the apertures 108a-c to determine whether a comestible is non-conforming. For instance, a data processing apparatus in the counter-stacker 100 can analyze the data to detect any non-moving comestible in the area around the apertures 108a-c. When the data processing apparatus detects a non-moving comestible, the data processing apparatus can determine that the non-moving comestible is a non-conforming comestible.

The counter-stacker 200, shown in FIG. 2A, can use artificial intelligence to analyze data received from the sensor system 210 to determine whether a comestible is non-conforming. For instance, the counter-stacker 200 can use machine learning to determine whether a comestible depicted in an image, captured by the sensor system 210, is non-conforming. The counter-stacker 200 can have a continuous learning process that updates based on predictions of non-conforming comestibles and actual non-conforming comestibles, e.g., comestibles that get stuck on the stacking frame 206.

Analysis of data from the sensor system 210 can be performed locally, e.g., by a controller in the counter-stacker 200. Analysis of data from the sensor system 210 can be performed remotely, e.g., by a device connected to the counter-stacker 200 using a network. For instance, a server located in a different physical room from the counter-stacker 200 can analyze data generated by the sensor system.

In some implementations, the counter-stacker 200 (FIG. 2A) can include separate rotatable elements within the stacking frame 206. For example, the counter-stacker 200 can include an outer frame that is fixed, e.g., similar to the outer frame 106a. Instead of a removable inner frame, the stacking frame 206 can include separate rotatable elements for each of the apertures, e.g., the apertures 108a-c. The number of separately rotatable elements can configurable based on the pressing pattern being used. For instance, when the counter-stacker 200 is processing comestibles with three processing lanes, e.g., a 3×3 pressing pattern, the outer frame can couple with three rotatable inner frames each of which include an aperture. Each of the inner frames can be coupled to one or more actuators, the latter of which also couple to the outer frame. When the counter-stacker 200 detects a non-conforming comestible for a particular processing lane, e.g., from the processing lanes 124a-c, the counter-stacker 200 can rotate the corresponding inner frame. For instance, when the counter-stacker 200 detects a non-conforming comestible for a processing lane 124a, the counter-stacker 200 can rotate the inner frame with the aperture 108a. When the counter-stacker 200 is processing comestibles with five processing lanes, e.g., a 5×5 pressing pattern, the outer frame can couple with five rotatable inner frames. In these implementations, rotation of a single inner frame can cause any comestibles on an upper surface of the inner frame to fall onto the reject conveyor 222 or another component for removal from the counter-stacker 200.

In some implementations, the counter-stacker 200 can include separate rotatable elements as part of the transfer device 202. For instance, when the stacking frame 206 includes a fixed outer frame and separate rotatable elements for each processing lane, the transfer device 202 can include the same number of rotatable elements. When the counter-stacker 200 detects a non-conforming comestible in a particular processing lane, the counter-stacker 200 can rotate the corresponding transfer device 202 element and the corresponding stacking frame 206 element.

When the counter-stacker 200 detects a non-conforming comestible, the counter-stacker 200 can rotate the transfer device 202 before rotating the stacking frame 206. For instance, when the counter-stacker 200 detects a non-conforming comestible, the counter-stacker 200, or a controller in the counter-stacker 200, can send a signal to one or more actuators coupled to the transfer device 202. Upon receipt of the signal, the one or more actuators can rotate the transfer device 202. Rotation of the transfer device 202 can remove any comestibles on the transfer device 202 from the counter-stacker 200, e.g., cause the comestibles to fall onto the reject conveyor 222 or another conveyor or component. Rotation of the transfer device 202 can prevent any additional comestibles from entering the counter-stacker 200 while the counter-stacker 200 removes any non-conforming comestibles, e.g., prevents any existing jams at the counter-stacker 200 from getting worse. After or concurrently with sending the signal to the one or more actuators coupled to the transfer device 202, the counter-stacker 200 can reverse the direction of the upper conveyor 204, rotate the stacking frame 206, reverse the direction of the lower conveyor 214, or a combination of two or more of these.

The counter-stacker 200 can intermittently actuate the reject conveyor 222. For instance, while creating comestible stacks, the counter-stacker 200 can be adapted to not actuate the reject conveyor 222. When the counter-stacker 200 detects a non-conforming comestible, the counter-stacker 200 can cause the reject conveyor 222 to actuate, e.g., move in a direction other than the direction D. The counter-stacker 200 can cause the reject conveyor 222 to actuate concurrently with, before, or after, sending a signal to the actuators coupled to the transfer device 202 that causes the transfer device 202 to rotate.

In some implementations, the counter-stacker 200, or a controller in the counter-stacker 200, can send a signal to a device prior to the counter-stacker 200 upon detection of a non-conforming comestible. The signal can indicate that the counter-stacker 200 detected a non-conforming comestible and that transfer of comestibles to the counter-stacker 200 should stop. For example, the counter-stacker 200 can send a signal to a monitoring station indicating that the monitoring station should stop sending comestibles to the counter-stacker 200, e.g., the monitoring station should reject all comestibles.

In these implementations, the monitoring station can separate comestibles that satisfy predetermined criteria for a current processing recipe from those comestibles that do not satisfy the predetermined criteria. A system that includes the monitoring station and the counter-stacker 200 can stack the comestibles that satisfy the predetermined criteria, e.g., using the counter-stacker 200 once the counter-stacker is cleared of any non-conforming comestibles.

The counter-stacker 200 can begin receiving comestibles again after the non-conforming comestible or all non-conforming comestibles are placed on the reject conveyor 222 or removed from the counter-stacker 200. For instance, when the counter-stacker 200 has removed the non-conforming comestible, or placed the non-conforming comestible on the reject conveyor 222, the counter-stacker 200 can send the device prior to the counter-stacker 200 another signal that indicates that the counter-stacker 200 can receive comestibles again. In some examples, the device prior to the counter-stacker 200 can automatically begin sending comestibles to the counter-stacker 200 after a predetermined period of time, e.g., sufficient to allow the counter-stacker 200 to remove the non-conforming comestible.

The counter-stacker 200 may detect a non-conforming comestible at any appropriate location on the transfer device 202, the upper conveyor 204, the stacking frame 206, or a combination of these. For instance, the counter-stacker 200 may detect a first non-conforming comestible on the upper conveyor 204 and then detect a second non-conforming comestible on an upper surface of the stacking frame 206.

Figure 3:
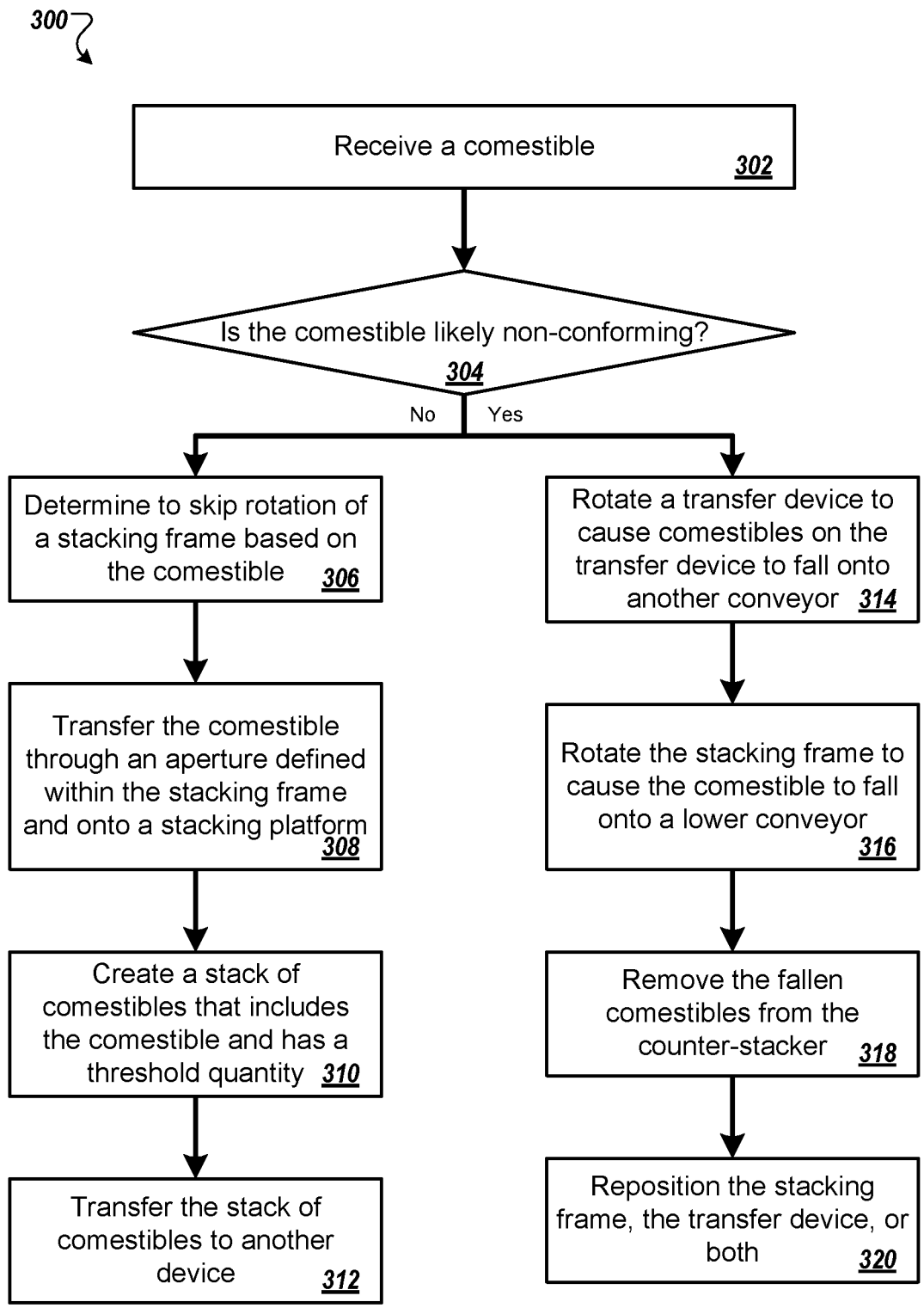
FIG. 3 is a flow diagram of a process for removing one or more comestibles from a counter-stacker.

FIG. 3 is a flow diagram of a process 300 for removing one or more comestibles from a counter-stacker. Each of the comestibles that are removed may be non-conforming. For instance, a first non-conforming comestible, e.g., a stalled comestible, may cause later comestibles to get jammed, become non-conforming, or both. The process 300 can be used by the counter-stacker 200, by the counter-stacker 100, or both.

A counter-stacker receives a comestible (302). For example, the counter-stacker receives the comestible from a monitoring station. The counter-stacker can receive the comestible using a conveyor, a transfer device, or another appropriate component included in the counter-stacker.

The counter-stacker determines whether the comestible is likely non-conforming (304). The counter-stacker can use one or more sensors, one or more controllers, or a combination of the two, to determine whether the comestible is likely non-conforming. The counter-stacker can determine a likelihood that the comestible is non-conforming. When the likelihood satisfies a threshold likelihood, the counter-stacker, e.g., the controller, can determine that the comestible is likely non-conforming.

If the counter-stacker determines that the comestible is not likely non-conforming, the counter stacker determines to skip rotation of a stacking frame based on the comestible (306). For instance, in response to determining that the comestible is not likely non-conforming, the counter-stacker determines to not remove the comestible from the counter-stacker.

In some implementations, the counter-stacker can perform the analysis of whether a comestible is likely non-conforming for multiple comestibles at the same time. Some of the comestibles may be in the same processing lane, e.g., that aligns with one of the apertures in a stacking frame and a column in a pressing pattern. Some of the comestibles may be in different processing lanes. For instance, the counter-stacker can analyze sensor data for multiple comestibles that are displaced from each other in a latitudinal direction.

The counter-stacker transfers the comestible through an aperture defined within the stacking frame and onto a stacking platform (308). For example, the counter-stacker rotates an upper conveyor on which the comestible is located. The momentum created by the movement of the upper conveyor can move the comestible from an upper surface of the upper conveyer and through the aperture defined within the stacking frame. The comestible can land on an upper surface of the stacking platform while substantially maintaining its shape from when the comestible was on the upper surface of the upper conveyor.

The counter-stacker creates a stack of comestibles that includes the comestible and has a threshold quantity (310). For instance, the counter-stacker repeats steps 302 through 308 for additional comestibles until the counter-stacker has placed the threshold quantity of comestibles in the stack of comestibles on a stacking platform.

The comestible can be any comestible in the stack of comestibles. The comestible can be a first comestible in the stack of comestibles. The comestible can be between the comestibles on either end of the stack of comestibles. The comestible can be the last comestible, located on the top of the stack of comestibles.

The counter-stacker transfers the stack of comestibles to another device (312). For example, the counter-stacker can transfer the stack of comestibles to a bagger using a lower conveyor. The counter-stacker can place the stack of comestibles onto the lower conveyor by lowering the stacking platform.

In response to determining that the comestible is likely non-conforming, the counter-stacker rotates a transfer device to cause comestibles on the transfer device to fall onto another conveyor (314). Rotation of the transfer device can prevent additional comestibles from being transferred onto an upper conveyor, the transfer device, or both. This can reduce an amount of comestibles the counter-stacker must remove before being able to continue processing additional comestibles, e.g., before being able to create additional stacks of comestibles. Rotation of the transfer device can reduce the severity of any stalls, jams, or both, that form on the counter-stacker, which in turn can reduce counter-stacker downtime.

The counter-stacker rotates the stacking frame to cause the comestible to fall onto a lower conveyor (316). Rotation of the stacking frame can cause multiple comestibles, including the comestible, to fall onto the lower conveyor. For instance, rotation of the stacking frame can cause comestibles located on an upper conveyor, on an upper surface of the stacking frame, or both, to fall onto the lower conveyor. Because the comestibles on the upper conveyor would normally pass through an aperture in the stacking frame, when the stacking frame rotates, the comestibles on the upper conveyor might not pass through an aperture in the stacking frame and might hit a surface, e.g., an upper surface, of the stacking frame. This prevents the comestibles from forming a stack on a stacking platform.

The counter-stacker can rotate the stacking frame after beginning rotation of the transfer device, concurrently with rotation of the transfer device, or before beginning rotation of the transfer device. For example, the counter-stacker can send a first signal to an actuator for the transfer device to cause rotation of the transfer device. The counter-stacker can send a second signal to an actuator for the stacking frame to cause rotation of the stacking frame. The counter-stacker can send the second signal after sending the first signal, after a predetermined period of time, or after rotation of the transfer device satisfies a threshold rotation angle.

After, concurrently with, or before sending a signal to cause rotation of the transfer device, the counter-stacker can send one or more signals to cause reversal of the upper conveyor or the lower conveyor or to initiate rotation of a reject conveyor. For instance, the counter-stacker can send a second signal to cause reversal of the lower conveyor after sending a first signal to cause rotation of the transfer device. The counter-stacker might not send a signal to cause reversal of the upper conveyor, e.g., and allow the upper conveyor to continue moving in a forward direction D. The counter-stacker might not send a signal to initiate rotation of the reject conveyor, e.g., when the reject conveyor continuously moves.

The counter-stacker removes the fallen comestibles from the counter-stacker (318). For instance, the counter-stacker can use a lower conveyor, a reject conveyor, or both, to remove the fallen comestibles from the counter-stacker. In some examples, the counter-stacker can use both the lower conveyor and the reject conveyor to remove comestibles from the counter-stacker that were located on the upper surface of the stacking frame, on the upper surface of an upper conveyor, or both. The counter-stacker can use the reject conveyor to remove comestibles that were on the transfer device from the counter-stacker. In some implementations, the counter-stacker can use the reject conveyor to remove comestibles from the counter-stacker that contact the transfer device while the transfer device was in the rotated position, e.g., comestibles a prior device, such as a monitoring station, attempted to send to the counter-stacker.

The counter-stacker repositions the stacking frame, the transfer device, or both (320). The counter-stacker can reposition the stacking frame to its location prior to the rotation at step 316. The counter-stacker can reposition the transfer device to its location prior to the rotation at step 314, e.g., in examples during which the counter-stacker rotated the transfer device. In examples in which the counter-stacker did not rotate one or both of the stacking frame or the transfer device, the counter-stacker does not need to reposition the respective component.

The counter-stacker can return any conveyors that were caused to move in a reverse direction to a normal operating mode, e.g., to rotation in the forward direction D. For instance, before the counter-stacker rotates the stacking frame, e.g., performs step 316, the counter-stacker can cause the lower conveyor to move in a reverse direction R. After the counter-stacker has removed the fallen comestibles from the lower conveyor, the counter-stacker can cause the lower conveyor to return to movement in a forward direction D, opposite the reverse direction R.

The order of steps in the process 300 described above is illustrative only, and removing the one or more comestibles from the counter-stacker can be performed in different orders. For example, the counter-stacker can rotate the stacking frame to cause a comestible to fall onto the lower conveyor before determining to skip rotation of the stacking frame based on another comestible. In some examples, the counter-stacker can rotate the transfer device before or substantially concurrently with rotation of the stacking frame.

In some implementations, the process 300 can include additional steps, fewer steps, or some of the steps can be divided into multiple steps. For example, the counter-stacker can perform each of the steps 302 through 320 multiple times for different comestibles. In some examples, the counter-stacker need not perform step 314. In some examples, the counter-stacker can perform steps 302, 316, and 318 without performing the other steps in the process 300. In some examples, the counter-stacker can perform steps 302, 308, and 310 without performing the other steps in the process 300. In some examples, the counter-stacker can perform steps 302, 306, and 308 without performing the other steps in the process 300.

Figure 4:
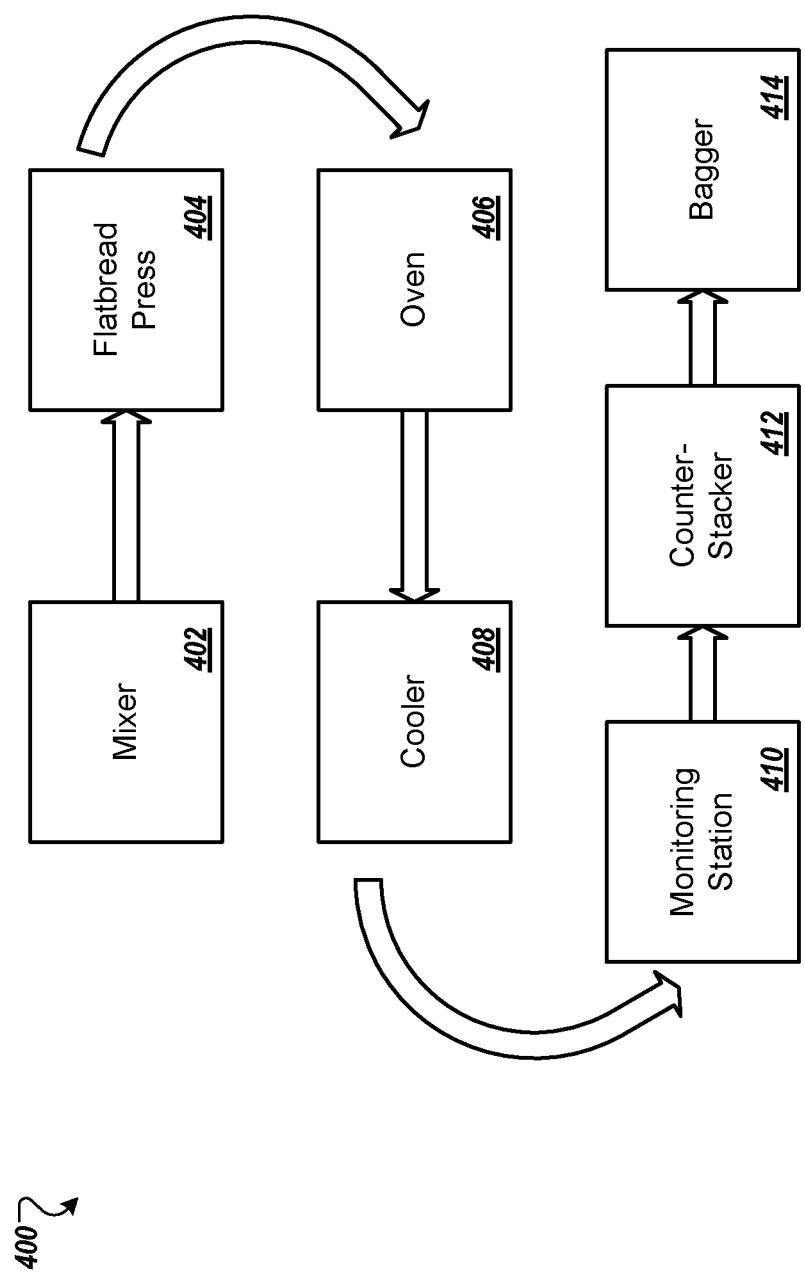
FIG. 4 depicts an example of some devices that can be included in a flatbread processing system.

FIG. 4 depicts an example of some devices that can be included in a flatbread processing system 400. The flatbread processing system 400 can be used to process the comestibles described above with reference to FIGS. 1A-1C, 2A-2B, and 3. The flatbread processing system 400 does not depict all components that could be included in a system, depending on system configuration, such as a dough ball loader that forms balls of dough from batter created by a mixer 402 and places the dough balls on the flatbread press 404.

The flatbread processing system 400 includes a mixer 402. The mixer 402 combines multiple ingredients according to a process recipe. The mixer 402 mixes the multiple ingredients to create a dough batter.

The mixer 402 can be connected to a former (not shown) that creates dough balls from the batter created by the mixer 402. The former can place the dough balls in a dough ball loader that is configured according to a pressing pattern for the flatbread being made by the flatbread processing system 400. The former selects an amount of batter based on a desired size for the dough balls, e.g., to create 10 inch tortillas or 8 inch tortillas.

The dough ball loader can place the dough balls on a conveyer included in the flatbread press 404. Once a dough ball is placed on a location on an upper surface of the conveyor for each of the locations in a pressing pattern, e.g., a 3×3 pressing pattern, the flatbread press 404 moves the conveyor forward to place the dough balls under the press. The flatbread press 404 then presses the dough balls. During the pressing operation, the flatbread press 404 can slightly bake the dough balls to increase a likelihood that the pressed dough balls will maintain their pressed shape.

The flatbread press 404 can then transfer the pressed dough balls to a discharge station included in the flatbread press 404. The discharge station can include a heater to parbake the pressed dough balls. Use of the discharge station can enable the flatbread press 404 to use a lower temperature during the pressing process.

The flatbread processing system 400 then transfers the pressed dough balls from the flatbread press 404 to an oven 406. The flatbread processing system 400 can use one or more conveyors to transfers the dough balls from the flatbread press 404 to the oven 406.

The oven 406 includes one or more oven conveyors that transfer the pressed dough balls through the oven 406 during a cooking process. As the one or more conveyors transfer the pressed dough balls through the oven 406, the pressed dough balls are cooked so that when the pressed dough balls exit the oven 406, the cooking process is complete. In some implementations, the pressed dough balls can proceed to another cooking process after removal from the oven 406.

After cooking, the flatbread processing system 400 can transfer the cooked, pressed dough balls onto one or more conveyors to transfer the pressed dough balls from the oven 406 to a cooler 408. In some implementations, the flatbread processing system 400 can use one or more conveyors that transfer the pressed dough balls to an upper portion of the cooler 408.

The cooler 408 can include multiple cooling conveyors that transport the pressed dough balls through the cooler 408. The cooler 408 can use any appropriate process, components, or both, to reduce the temperature of the pressed dough balls. For instance, as the pressed dough balls move through the cooler 408, air can move across the surfaces of the pressed dough balls cools the pressed dough balls to a reduced temperature.

In some examples, the pressed dough balls can have a temperature close to 200° F. when entering the cooler 408. The cooler can include one or more fans to move air from an environment outside of the cooler 408 (e.g., at an ambient temperature between about 65 to about 80° F.) across the cooling conveyors and the pressed dough balls. As the air passes across the pressed dough balls, heat is removed from the pressed dough balls and the pressed dough balls are cooled.

The flatbread processing system 400 transfers the pressed dough balls from the cooler to a monitoring station 410. The monitoring station 410 can analyze one or more properties of the pressed dough balls, including the diameter and color. For instance, the monitoring station 410 can determine whether a pressed dough ball was burnt, conforms with size requirements for a recipe for the pressing pattern, or both.

The monitoring station 410 can include a dough ball removal device used to remove dough balls from the monitoring station that do not conform to predetermined criteria for the recipe. For instance, the monitoring station can include one or more air blowers, e.g., one for each processing lane for the pressing pattern, to remove pressed dough balls that were overcooked, pressed too much, not pressed enough, or a combination of these.

The flatbread processing system 400 transfers the pressed dough balls that conform to the predetermine criteria to a counter-stacker 412. The counter-stacker 412 can be the counter-stacker 100, the counter-stacker 200, or both, described above with reference to FIGS. 1A-2B. The counter-stacker can create stacks of pressed dough balls based on a stack quantity identified in the recipe for the flatbread processing system 400.

The flatbread processing system 400 transfers stacks of pressed dough balls to a bagger 414 that places each stack into a bag. The bagged stack of pressed dough balls can then be removed from the bagger 414 and the flatbread processing system 400.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
a counter-stacker that comprises:
a support frame;
a stacking frame defining one or more apertures therein and adapted to enable a comestible to move through one of the one or more apertures such that the comestible substantially maintains its shape;
one or more stacking platforms coupled to the support frame, each of the one or more stacking platforms (i) adapted to extend into a respective one of the one or more apertures, (ii) having an upper surface adapted to support a plurality of comestibles, and (iii) adapted to move relative to a conveyor to place the plurality of comestibles supported by the upper surface on the conveyor when a quantity of comestibles satisfies a threshold quantity;
a sensor adapted to detect a quantity of the comestibles on the upper surface of at least one of the one or more stacking platforms; and
one or more actuators (a) coupled to the stacking frame and the support frame and (b) adapted to rotate the stacking frame, that defines the one or more apertures through which the stacking frame enables a comestible to move, to cause removal of a non-conforming comestible from the counter-stacker.

2. The system of claim 1, wherein the counter-stacker comprises the conveyor coupled to the support frame and adapted to (i) move in a first direction to remove a comestible from an upper surface of one of the one or more stacking platforms and (ii) move in a second direction to remove the non-conforming comestible from the counter-stacker.

3. The system of claim 2, comprising a non-conforming comestible removal device adapted to receive the non-conforming comestible from the conveyor.

4. The system of claim 3, comprising a reject conveyor adapted to receive the non-conforming comestible from the conveyor and transfer the non-conforming comestible to the non-conforming comestible removal device.

5. The system of claim 3, wherein the non-conforming comestible removal device comprises a conveyor, or a cart.

6. The system of claim 2, wherein the conveyor is adapted to (i) move in the first direction along a plane to remove the comestible, which substantially maintains its shape while moving through one of the one or more apertures, from the upper surface of one of the one or more stacking platforms and (ii) move in the second direction that is opposite the first direction along the plane to remove the non-conforming comestible from the counter-stacker.

7. The system of claim 2, wherein the conveyor is adapted to remove a stack of comestibles that has the threshold quantity from the upper surface of the one or more stacking platforms.

8. The system of claim 2, wherein the counter-stacker comprises a support adapted to remove a comestible from the conveyor before the conveyor moves in the second direction to remove the non-conforming comestible from the counter-stacker.

9. The system of claim 8, wherein:
the conveyor comprises a plurality of belts adapted to support comestibles; and
the counter-stacker comprises a plurality of supports including the support adapted to move between two adjacent belts from the plurality of belts to support a comestible to enable the conveyor to move in the second direction to remove the non-conforming comestible from the counter-stacker.

10. The system of claim 1, wherein the counter-stacker comprises a conveyor coupled to the support frame and adapted to transfer comestibles from the plurality of comestibles to one of the one or more apertures in the stacking frame.

11. The system of claim 10, wherein the counter-stacker comprises a transfer device coupled to the support frame that is adapted to (i) receive a comestible from a prior processing device and (ii) transfer the comestible to the conveyor.

12. The system of claim 11, wherein the counter-stacker comprises one or more second actuators adapted to rotate the transfer device between 60 and 180 degrees.

13. The system of claim 11, wherein the transfer device comprises one or more second actuators adapted to rotate the transfer device to a reject position to prevent the transfer device from receiving a comestible from the prior processing device.

14. The system of claim 13, wherein the one or more second actuators are adapted to rotate the transfer device to the rejection position concurrently with the rotation of the stacking frame by the one or more actuators that causes removal of the non-conforming comestible from the counter-stacker.

15. The system of claim 11, wherein the transfer device is adapted to align a comestible with a processing lane.

16. The system of claim 15, wherein the transfer device comprises an air blower that is adapted to align the comestible with the processing lane.

17. The system of claim 1, wherein:
the sensor is adapted to detect whether a comestible on the counter-stacker is not aligned with a processing lane in the counter-stacker; and
at least one of the one or more actuators is adapted to rotate the stacking frame upon detection of a non-conforming comestible by the sensor.

18. The system of claim 17, wherein the sensor is adapted to detect that a comestible is stalled on the stacking frame.

19. The system of claim 17, wherein the sensor is an infrared sensor.

20. The system of claim 17, wherein the sensor is a camera.

21. The system of claim 17, wherein the sensor comprises a plurality of sensors including one or more counting sensors that are adapted to detect a quantity of the comestible and are separate sensors from one or more non-conforming comestible sensors that are adapted to detect whether a comestible on the counter-stacker is non-conforming.

22. The system of claim 17, wherein:
- the counter-stacker is adapted to receive a plurality of comestibles previously processed in a pressing system that forms the plurality of comestibles according to a pressing pattern; and
- each lane in the pressing pattern corresponds to a processing lane in the counter-stacker and one of the one or more apertures.

23. The system of claim 22, comprising the pressing system.

24. A system comprising:
- a counter-stacker that comprises:
  - a support frame;
  - a stacking frame defining one or more apertures therein and adapted to enable a comestible to move through the one or more apertures such that the comestible substantially maintains its shape;
  - one or more stacking platforms coupled to the support frame, each of the one or more stacking platforms (i) adapted to extend into a respective one of the one or more apertures, (ii) having an upper surface adapted to support a plurality of comestibles, and (iii) adapted to move relative to a conveyor to place the plurality of comestibles supported by the upper surface on the conveyor when a quantity of comestibles satisfies a threshold quantity;
  - a sensor adapted to detect a quantity of the comestibles on the upper surface of at least one of the one or more stacking platforms; and
  - one or more actuators coupled to the stacking frame and the support frame and adapted to rotate the stacking frame between 90 and 180 degrees to cause removal of a non-conforming comestible from the counter-stacker.

25. The system of claim 24, wherein the one or more actuators are adapted to:
- rotate, in a first direction, the stacking frame from a first substantially horizontal loading position and a second unloading position that is between 90 and 180 degrees from the first substantially horizontal loading position; and
- rotate, in a second direction that is opposite the first direction, the stacking frame from the second unloading position to the first substantially horizontal loading position.

* * * * *